(12) United States Patent
Gupta et al.

(10) Patent No.: US 10,072,478 B2
(45) Date of Patent: Sep. 11, 2018

(54) METHODS OF USING SUPERABSORBENT POLYMERS FOR FRACTURING AND SAND CONTROL APPLICATIONS

(71) Applicants: D. V. Satyanarayana Gupta, The Woodlands, TX (US); Scott G. Nelson, Cypress, TX (US)

(72) Inventors: D. V. Satyanarayana Gupta, The Woodlands, TX (US); Scott G. Nelson, Cypress, TX (US)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 0 days.

(21) Appl. No.: 15/084,567

(22) Filed: Mar. 30, 2016

(65) Prior Publication Data
US 2016/0289547 A1 Oct. 6, 2016

Related U.S. Application Data

(60) Provisional application No. 62/140,105, filed on Mar. 30, 2015.

(51) Int. Cl.
| | |
|---|---|
| *E21B 43/267* | (2006.01) |
| *E21B 43/26* | (2006.01) |
| *C09K 8/80* | (2006.01) |
| *C09K 8/62* | (2006.01) |
| *E21B 37/06* | (2006.01) |
| *C09K 8/52* | (2006.01) |
| *E21B 33/134* | (2006.01) |
| *C09K 8/70* | (2006.01) |
| *C09K 8/76* | (2006.01) |
| *E21B 33/138* | (2006.01) |
| *C09K 8/575* | (2006.01) |
| *C09K 8/68* | (2006.01) |
| *E21B 43/04* | (2006.01) |
| *C09K 8/035* | (2006.01) |
| *C09K 8/12* | (2006.01) |
| *C09K 8/34* | (2006.01) |
| *E21B 21/00* | (2006.01) |

(52) U.S. Cl.
CPC ............. *E21B 37/06* (2013.01); *C09K 8/035* (2013.01); *C09K 8/12* (2013.01); *C09K 8/34* (2013.01); *C09K 8/52* (2013.01); *C09K 8/5756* (2013.01); *C09K 8/62* (2013.01); *C09K 8/68* (2013.01); *C09K 8/685* (2013.01); *C09K 8/70* (2013.01); *C09K 8/703* (2013.01); *C09K 8/706* (2013.01); *C09K 8/76* (2013.01); *C09K 8/80* (2013.01); *E21B 21/00* (2013.01); *E21B 21/003* (2013.01); *E21B 33/134* (2013.01); *E21B 33/138* (2013.01); *E21B 43/04* (2013.01); *E21B 43/26* (2013.01); *E21B 43/267* (2013.01); *C09K 2208/26* (2013.01)

(58) Field of Classification Search
CPC .......... E21B 43/267; E21B 43/26; C09K 8/80; C09K 8/62
See application file for complete search history.

(56) References Cited

U.S. PATENT DOCUMENTS

| | | | |
|---|---|---|---|
| 3,425,971 A | 2/1969 | Gugliemelli et al. | |
| 4,286,082 A | 8/1981 | Tsubakimoto et al. | |
| 5,086,841 A | 2/1992 | Reid et al. | |
| 5,143,157 A | 9/1992 | Harms | |
| 5,441,109 A | 8/1995 | Gupta et al. | |
| 5,806,597 A | 9/1998 | Tjon-Joe-Pin et al. | |
| 5,981,447 A | 11/1999 | Chang et al. | |
| 6,164,380 A | 12/2000 | Davis | |
| 6,169,058 B1 | 1/2001 | Le et al. | |
| 6,410,489 B1 | 6/2002 | Zhang et al. | |
| 6,419,019 B1 | 7/2002 | Palmer et al. | |
| 7,971,643 B2 | 7/2011 | Brannon et al. | |
| 8,109,336 B2 | 2/2012 | Wheeler et al. | |
| 8,839,859 B2 | 9/2014 | Ivan et al. | |
| 2002/0007949 A1 | 1/2002 | Tolman et al. | |
| 2002/0040812 A1 | 4/2002 | Heying | |
| 2003/0236171 A1 | 12/2003 | Nguyen et al. | |
| 2004/0040713 A1 | 3/2004 | Nguyen et al. | |
| 2005/0080182 A1 | 4/2005 | Ahmed et al. | |
| 2006/0086501 A1 | 4/2006 | Creel et al. | |
| 2008/0085843 A1 | 4/2008 | Wang et al. | |
| 2009/0082228 A1 | 3/2009 | Parris et al. | |
| 2009/0095324 A1 | 4/2009 | Crowther et al. | |
| 2009/0221453 A1 | 9/2009 | Mukhopadhyay et al. | |
| 2010/0089581 A1* | 4/2010 | Nguyen .................. | C09K 8/685 166/280.2 |
| 2010/0099781 A1 | 4/2010 | Tian et al. | |

(Continued)

OTHER PUBLICATIONS

"VaporFrac Fracturing Fluid", Retrieved from the internet [https://www.bakerhughes.com/products-and-services/pressure-pumping/hydraulic-fracturing/fracturing-fluid-systems-proppant-technology/proppant-technology-vaporfrac], Baker Hughes; 10 pages.

Dragan, "Design and applications of interpenetrating polymer network hydrogels, a review", Chemical Engineering Journal 243 (2014), pp. 572-590.

(Continued)

*Primary Examiner* — Catherine A Loikith
(74) *Attorney, Agent, or Firm* — Cantor Colburn LLP

(57) ABSTRACT

A method of treating a subterranean formation comprises forming a storable aqueous suspension comprising a carrier fluid, a superabsorbent polymer, a proppant the proppant being suspended in the carrier fluid as a substantially perfectly supported particulate; diluting the storable aqueous suspension in-line to a desired concentration; and introducing the diluted storable aqueous suspension into the subterranean formation. A sand control method is also disclosed.

8 Claims, No Drawings

(56) References Cited

U.S. PATENT DOCUMENTS

| | | |
|---|---|---|
| 2010/0126735 A1 | 5/2010 | Allison et al. |
| 2010/0253454 A1 | 10/2010 | Schilling et al. |
| 2012/0252264 A1 | 10/2012 | Zraik |
| 2013/0056213 A1 | 3/2013 | Medvedev et al. |
| 2013/0233545 A1 | 9/2013 | Mahoney et al. |
| 2013/0248191 A1 | 9/2013 | Nguyen |
| 2014/0000896 A1 | 1/2014 | Wang et al. |
| 2014/0000897 A1 | 1/2014 | Wang et al. |
| 2014/0024561 A1 | 1/2014 | Reddy et al. |
| 2014/0158355 A1 | 6/2014 | Wuthrich et al. |
| 2014/0251610 A1 | 9/2014 | Brannon et al. |
| 2014/0332213 A1 | 11/2014 | Zhou |
| 2014/0332214 A1 | 11/2014 | Zhou et al. |
| 2016/0289530 A1 | 10/2016 | Nelson |
| 2016/0289541 A1 | 10/2016 | Zhou et al. |
| 2016/0289547 A1 | 10/2016 | Gupta et al. |
| 2016/0290104 A1 | 10/2016 | Nelson et al. |

OTHER PUBLICATIONS

International Search Report, International Application No. PCT/US2016/024864, dated Jul. 25, 2016, Korean Intellectual Property Office; International Search Report 4 pages.

Written Opinion of the International Searching Authority, International Application No. PCT/US2016/024864, dated Jul. 25, 2016; Written Opinon 7 pages.

* cited by examiner

METHODS OF USING SUPERABSORBENT POLYMERS FOR FRACTURING AND SAND CONTROL APPLICATIONS

CROSS REFERENCE TO RELATED APPLICATION

This application claims the benefit of U.S. patent application Ser. No. 62/140,105, filed Mar. 30, 2015, which is incorporated by reference in its entirety herein.

BACKGROUND

The disclosure relates to the use of superabsorbent polymers with conventional hydraulic fracturing proppants and relatively lightweight proppant or the composites thereof for fracturing applications. The application also relates to the use of superabsorbent polymers and their composites for sand control applications.

Hydraulic fracturing increases the flow of desirable fluids such as oil and gas from a subterranean formation and involves placing a fracturing fluid into a subterranean formation or zone at a rate and pressure sufficient to impart a stress in the formation or zone with attendant production of a fracture in the formation or zone.

Beyond creating the fracture, the fracturing fluid also transports a proppant into the fracture. The proppant keeps the fracture open after release of the exerted pressure. Further, the proppant establishes conductive means in which the formation fluids flow to the borehole. Since the proppant provides a higher conductivity than the surrounding rock, the fracture has greater potential for production of hydrocarbons.

During fracturing or other well operations, some proppant particles can settle out of the fracturing fluids if the fracturing fluids do not have good proppant transport properties. The settled out proppant may migrate toward the near wellbore area due to drag or other forces. The migrated proppant can plug, erode or cause significant wear of downhole equipment and surface facilities. The migrated proppant can also plug or clog flow channels in the formation, thereby significantly reducing well productivity.

Thus it would be desirable to provide alternative methods of fracturing a subterranean formation. It would also be desirable to provide a method to filter formation sand out of the desired production material so that their migration is reduced or substantially prevented.

SUMMARY

In an embodiment, a method of treating a subterranean formation comprises forming a storable aqueous suspension comprising a carrier fluid, a superabsorbent polymer, a proppant, the proppant being suspended in the carrier fluid as a substantially perfectly supported particulate slurry; diluting the storable aqueous suspension in-line to a desired concentration; and introducing the diluted storable aqueous suspension into the subterranean formation.

In another embodiment, a method of fracturing a subterranean formation comprises suspending a proppant in a fluid comprising an aqueous-based carrier and a superabsorbent polymer to form a proppant-containing fluid; combining the proppant-containing fluid with a gaseous fluid to form a fracturing composition, the gaseous fluid constituting less than about 50 volume percent, based on the total volume of the fracturing composition; and introducing the fracturing composition into the subterranean formation, wherein the sum of the volumes of the proppant, the superabsorbent polymer, and the gaseous fluid is greater than about 50% based on the total volume of the fracturing composition.

A sand control method for a wellbore penetrating a subterranean formation comprises: introducing into the wellbore a formation sand control composition comprising a superabsorbent polymer, a proppant, and a carrier fluid; and placing the superabsorbent polymer and the proppant particles adjacent the subterranean formation to form a fluid-permeable pack capable of reducing or substantially preventing the passage of formation sand from the subterranean formation into the wellbore while allowing passage of formation fluids from the subterranean formation into the wellbore.

DETAILED DESCRIPTION

It has been found that suspensions containing a superabsorbent polymer and a proppant exhibit sufficient suspension stability for short to moderate term storage. Such suspensions may then be pumped or placed downhole as is or diluted on the fly.

Use of a storable pumpable suspension offers significant operational, logistical and economic advantages. The slurries may be pre-mixed at a remote site and transported to location. Alternatively, the slurry could be mixed on location prior to treatment.

Further, the use of a perfectly supported proppant containing slurry eliminates the need for a slurry blender, as well as fluid mixing unit, on location since a simple configuration of metering valves and a pump would allow the neat slurry to be diluted in-line with water or gas or a combination thereof to the desired concentration. A further benefit is the improved control of concentrations of proppants, especially since liquids are more accurately metered than solids.

The elimination of equipment on location has several economic advantages in that it saves on equipment costs and, in areas where job location space is at a premium, such as at mountainside locations, wells that were previously incapable of being stimulated become realistic targets. Further, the suspension of the disclosure provides the opportunity to pump the slurry concentrate from a transport located some distance from the well location versus conventional systems which require proppant transport near the blender and wellhead.

The storable slurry comprises a proppant, a carrier fluid, and a superabsorbent polymer. As used herein, "substantially perfectly supported" means that there is less than about 15 volume %, less than about 10 volume %, or less than about 5 volume % phase separation.

The proppant can be any propping material used in the industry such as sand characterized as API sand, ceramic proppants of varying densities including light weight ceramics, intermediate strength proppant and high strength bauxite proppants or ultra light weight proppant as described below.

By "relatively lightweight" it is meant that a particulate has a density that is substantially less than a conventional proppant particulate material employed in hydraulic fracturing operations, e.g., sand. The "relatively lightweight" include ultra lightweight density particulates having an apparent specific gravity (API RP 60) of less than about 2.4. In some embodiments, the ultra lightweight proppant as used herein can have an apparent specific gravity of less than about 2.4, less than about 2, less than about 1.5, or less than about 1.1.

Examples of suitable relatively lightweight proppant include, but are not limited to, naturally occurring proppant particles including nut shells such as walnut, coconut, pecan, almond, ivory nut, brazil nut, and the like; seed shells of fruits such as plum, olive, peach, cherry, apricot, and the like; seed shells of other plants such as maize (e.g., corn cobs or corn kernels); wood materials such as those derived from oak, hickory, walnut, poplar, mahogany, and the like. Such materials are particles formed by crushing, grinding, cutting, chipping, and the like. These proppant particles are relatively lightweight, which have been described in U.S. Pat. No. 6,364,018. The relatively lightweight proppant can also be a porous ceramic or organic polymeric particulates, such as those described in U.S. Pat. No. 7,971,643. Relatively lightweight proppant particles are commercially available as LiteProp™ from Baker Hughes Inc.

In an embodiment, the proppant particles are coated, e.g., with a resin. That is, individual proppant particles have a coating applied thereto. In this manner, if the proppant particles are compressed during or subsequent to, e.g., fracturing, at a pressure great enough to produce fine particles therefrom, the fine particles remain consolidated within the coating so they are not released into the formation. It is contemplated that fine particles decrease conduction of hydrocarbons (or other fluid) through fractures or pores in the fractures and are avoided by coating the proppant particles. Coating for the proppant particles includes cured, partially cured, or uncured coatings of, e.g., a thermoset or thermoplastic resin.

The coating can be an organic compound that includes epoxy, phenolic, polyurethane, polycarbodiimide, polyamide, polyamide imide, furan resins, or a combination thereof. The phenolic resin is, e.g., a phenol formaldehyde resin obtained by the reaction of phenol, bisphenol, or derivatives thereof with formaldehyde. Exemplary thermoplastics include polyethylene, acrylonitrile-butadiene styrene, polystyrene, polyvinyl chloride, fluoroplastics, polysulfide, polypropylene, styrene acrylonitrile, nylon, and phenylene oxide. Exemplary thermosets include epoxy, phenolic (a true thermosetting resin such as resole or a thermoplastic resin that is rendered thermosetting by a hardening agent), polyester resin, polyurethanes, epoxy-modified phenolic resin, and derivatives thereof The curing agent for the coating includes nitrogen-containing compounds such as amines and their derivatives; oxygen-containing compounds such as carboxylic acid terminated polyesters, anhydrides, phenol-formaldehyde resins, amino-formaldehyde resins, phenol, bisphenol A and cresol novolacs, phenolic-terminated epoxy resins; sulfur-containing compounds such as polysulfides, polymercaptans; and catalytic curing agents such as tertiary amines, Lewis acids, Lewis bases; or a combination thereof.

In an embodiment, the proppant particles include a crosslinked coating. The crosslinked coating typically provides crush strength, or resistance, for the proppant particles and prevents agglomeration of the proppant particles even under high pressure and temperature conditions. In some embodiments, the proppant particles have a curable coating, which cure subsurface, e.g. downhole or in a fracture. The curable coating cures under the high pressure and temperature conditions in the subsurface reservoir. Thus, the proppant particles having the curable coating are used for high pressure and high temperature conditions.

Methods of coating are not particularly limited. According to an embodiment, the coating is disposed on the proppant particles by mixing in a vessel, e.g., a reactor. Individual components, e.g., the proppant particles and resin materials (e.g., reactive monomers used to form, e.g., an epoxy or polyamide coating) are combined in the vessel to form a reaction mixture and are agitated to mix the components. Further, the reaction mixture is heated at a temperature or at a pressure commensurate with forming the coating. In another embodiment, the coating is disposed on the particle via spraying such as by contacting the proppant particles with a spray of the coating material. The coated proppant particles are heated to induce crosslinking of the coating.

The proppant particles have a size from 1 µm to 2000 µm, specifically 10 µm to 1000 µm, and more specifically 10 µm to 500 µm. Further, the proppant particles have any shape including spherical, angular, and polyhedral and are monodisperse or polydisperse with an average particle size distribution that is unimodal or multimodal, e.g., bimodal.

The carrier fluids for the storable slurries can be water or brine. The superabsorbent polymer is present in an amount that is effective to keep the slurries storable for at least 1 hour, at least 2 hours, or at least five hours. A storable slurry or suspension refers to a slurry that has less than about 15 volume %, less than about 10 volume %, or less than about 5 volume % phase separation during storage. Depending on the specific proppant, carrier fluid, and the superabsorbent polymer selected, the amount of the superabsorbent polymer can be about 10 pounds to about 100 pounds or about 20 pounds to about 50 pounds per one thousand gallons of the slurries.

A suspension of the proppant in a carrier may serve as a storable aqueous pumpable suspension when the proppant is substantially perfectly supported in the slurry.

The storable suspension may further contain a friction reducing agent, the amount of friction reducing agent being between about 0 to about 10 pounds per thousand gallons of slurry. Suitable friction reducing agents include guar, hydroxypropyl guar, acrylamides including acrylamide copolymers, aliphatic alcohols, aliphatic acids, aliphatic amines, aliphatic amides, and alkoxylated alkanolamides. The slurry may also include a gelling agent known in the art. Advantageously, friction reducing agents and gelling agents are not needed for the storable slurries disclosed herein.

The storable suspension can be prepared by combining a carrier fluid, a superabsorbent polymer and a proppant. Alternatively, the storable suspension is formed by combining a carrier fluid with a composite of the proppant and the superabsorbent polymer in an unhydrated form.

It has been found that superabsorbent polymers in unhydrated form can be placed within a proppant or at least partially embedded into a void area of the proppant. The placement of a superabsorbent polymer into a proppant allows for polymer swelling thus in combination with the proppant reduces the resulting particle's effective density. Without wishing to be bound by theory, it is believed that suspension of such composites can have improved transport capability. The polymer particles when swollen would act to transport, by means of towing, the proppant along as the superabsorbent polymer is carried deeper into the fracture. The ability to affect the settling rate of proppants by reducing the effective density can then be addressed.

The superabsorbent polymer in the composite is in an unhydrated form. The proppant has empty spaces or pores. The superabsorbent polymer at least partially embedded in the empty spaces of the proppants, thus mechanically locking the two components together. The porous particulate material shall include any naturally occurring or manufactured or engineered porous ceramic particulate material that has an inherent and/or induced porosity. The types of proppants that could be used would include hollow rod proppants and those where void space is found, or spaces are intentionally created on the proppants, surface. Proppants with void areas include those within the line of LiteProp™ materials.

A commercially available instrument, ACCUPYC 1330 Automatic Gas Pycnometer (Micromeritics, Norcross, Ga.), that uses helium as an inert gas and the manufacturer's recommended procedure can be used to determine the internal porosity of the particulates. The internal porosity of the proppant used to make the composite is generally from about 5 to about 40 volume percent or about 10 to about 35 volume percent or about 15 to about 25 volume percent.

Examples of non-natural porous particulate materials for use in the composite include, but are not limited to, porous ceramic particles such as those particles available from Carbo Ceramics Inc. as ECONOPROP, and those fired kaolinitic described in U.S. Pat. No. 5,188,175. As described in this patent such particles may include solid spherical pellets or particles from raw materials (such as kaolin clay) having an alumina content of between about 25% and 40% and a silica content of between about 50% and 65%. A starch binder may be employed. Such particles may be characterized as having a ratio of silicon dioxide to alumina content of from about 1.39 to about 2.41, and an ASG of between about 2.20 and about 2.60 or between about 2.20 and about 2.70.

It will also be understood that porous ceramic particles may be selectively manufactured from raw materials such as those described in U.S. Pat. Nos. 5,188,175; 4,427,068; and 4,522,731, such as by inclusion of selected process steps in the initial material manufacturing process to result in a material that possesses desired characteristics of porosity, permeability, apparent density or ASG, and combinations thereof. For example, such raw materials may be fired at relatively low temperature of about 1235° F. or about 1300° F. to achieve a desired crystalline structure and a more highly porous and lighter structure. In one exemplary embodiment of such particles, about 20/40 mesh size porous material fired kaolinitic particles from Carbo Ceramics Inc. may be selected for use in the composite. These particles have the following internal characteristics: bulk apparent density about 1.16, internal porosity about 59.3%.

As used herein, the term "embedded" shall further refer to partially or completely impregnated with a superabsorbent polymer, by for example, vacuum and/or pressure impregnation. For example, porous proppants may be immersed in a superabsorbent polymer in an unhydrated form and then exposed to pressure and/or vacuum to at least partially penetrate or impregnate the proppant. The extent of penetration of the superabsorbent polymer of the porous proppant is from less than about 1% penetration by volume to less than about 25% penetration by volume.

The composite can be made by treating with the porous proppant with superabsorbent polymers using any suitable wet or dry process. The porosity characteristics of the porous proppants allow the unhydrated superabsorbent polymer to be drawn at least partially into the porous matrix of the porous proppants by capillary action. Alternatively, one or more superabsorbent polymers may be drawn at least partially into the porous matrix of the porous particulate material using a vacuum, and/or may be forced at least partially into the porous matrix under pressure. In another embodiment a sheet of superabsorbent polymer is mixed and pressed against proppant particles so that the proppants are bonded to the superabsorbent polymer sheet.

The aqueous suspension of proppant can be used directly for downhole treatments such as fracturing and sand control operations. Alternatively, the storable aqueous suspension can be diluted in-line to a desired concentration then introduced into the subterranean formation. An exemplary method comprises formulating a storable aqueous suspension at a site remote from the site where hydraulic fracturing is to occur, transferring the storable aqueous suspension to the site where hydraulic fracturing is to occur and storing the suspension at the site until required for fracturing, diluting the storable suspension in-line to a desired concentration; and injecting the diluted storable aqueous suspension under pressure into the formation by pumping the diluted storable aqueous suspension through at least one pump at a pressure sufficient to initiate a fracture in the formation.

An aqueous based slurry containing a proppant and a superabsorbent polymer can also be foamed with a gas constituent. Because the superabsorbent polymer particles can form part of the internal phase, high quality foams can be generated under pumping conditions. Examples of the gas constituent are air, nitrogen, carbon dioxide, natural gas and the like, or mixtures thereof or a combination comprising at least one of the foregoing. In one embodiment, the gas constituent is nitrogen Conventional foam fracturing fluids based on linear guar or viscoelastic surfactant gels typically use 65 to 70 quality (volume percent) of gas for optimum proppant transport. However, the viscoelastic gels at high temperatures tend to be unstable. Replacing the viscoelastic gels or using viscoelastic gels together with a superabsorbent can improve the temperature stability of the fracturing fluids. Foam fracturing fluids with superabsorbent polymers can also use less gas as the particles of the superabsorbent polymer will form part of the internal phase and hence will increase viscosity with less than about 50 quality (volume percent) of the gas constituent for proppant transport, provided that the sum of the volumes of the gas constituent, the superabsorbent polymer, and the proppant is greater than about 50%, based on the total volume of the fracturing fluids. The volume of the superabsorbent polymer refers to the volume of the superabsorbent polymer in an unhydrated form or in a hydrated form.

In an embodiment, the storable suspension or a diluted storable suspension can be combined with a gaseous fluid under pressure to form a treatment fluid. Then the treatment fluid is introduced into the subterranean formation. Advantageously the gaseous fluid constitutes less than about 50 volume percent, based on the total volume of the treatment fluid, and the sum of the volumes of the gas fluid, the superabsorbent polymer, and the proppant is greater than about 50%, based on the total volume of the treatment fluid. The volume of the superabsorbent polymer refers to the volume of the superabsorbent polymer in an unhydrated form or in a hydrated form.

In another embodiment, a foam fracturing fluid can be prepared by suspending a proppant in a fluid comprising an aqueous-based carrier and a superabsorbent polymer to form a proppant-containing fluid; combining the proppant-containing fluid with a gaseous fluid to form a fracturing composition, the gaseous fluid constituting less than about 50 volume percent, and the sum of the volumes of the gaseous fluid, the proppant, and the superabsorbent polymer being greater than about 50%, each based on the total volume of the fracturing composition; and introducing the fracturing composition into the subterranean formation. The volume of the superabsorbent polymer refers to the volume of the superabsorbent polymer in an unhydrated form in a hydrated form.

The foamed fluid is characterized by one or more rheological properties. Such rheological properties include foam quality (as discussed above), foam height and foam half-life. The rheological properties are suitably selected for the particular hydraulic fracturing application The foam height is the measure of the initial height of the foam, for example, according to the Ross-Miles test, in which foam is created by allowing the liquid phase to fall over a standardized height in a partially filled container. In one embodiment, the foamed fracturing fluid has a foam height of from about 100 ml to about 900 ml, specifically about 200 ml to about 800 ml, more specifically about 400 ml to about 750 ml.

The half-life of the foamed fracturing fluid is a measurement of the lifetime of the foamed fracturing fluid. The foam half-life is the time after which the maximum volume of foam is reduced by a factor of two. In one embodiment, the foamed fracturing fluid has a half-life of about 3 to about 120 minutes, specifically about 10 to about 60 minutes, more specifically about 15 to about 50 minutes. In another embodiment, the half-life of the foamed fracturing fluid is at least about 10 minutes or greater.

A pad fluid may precede the introduction of the foamed fracturing fluid into the formation. The pad fluid may contain a reactive fluid such as HCl acid or a gaseous fluid and is introduced into the formation at a pressure sufficient to initiate a fracture. The pad fluid is preferably composed entirely of a gas or a mixture of gases. The pad fluid may further contain an aqueous fluid, including a an aqueous based fluid with or without proppant. Where the pad fluid contains a mixture of gaseous fluid and aqueous fluid, the amount of gaseous fluid in the pad fluid mixture is at least 30 preferably 70, preferably at least 90, more preferably at least 95, volume percent. A superabsorbent polymer as described herein may be present. The pad fluid may further contain one or more proppants.

The fluid can further be foamed by inclusion of a non-gaseous foaming agent. The non-gaseous foaming agent can be amphoteric, cationic, or anionic. Suitable amphoteric foaming agents include alkyl betaines, alkyl sultaines, and alkyl carboxylates. Suitable anionic foaming agents can include alkyl ether sulfates, ethoxylated ether sulfates, phosphate esters, alkyl ether phosphates, ethoxylated alcohol phosphate esters, alkyl sulfates, and alpha olefin sulfonates. Suitable cationic foaming agents can include alkyl quaternary ammonium salts, alkyl benzyl quaternary ammonium salts and alkyl amido amine quaternary ammonium salts. Foam system is mainly used in fracturing low pressure or water sensitive formations.

As used herein, a superabsorbent polymer (SAP) is a crosslinked polymer that is capable of absorbing large amounts of aqueous liquids, such as water and brine, with swelling and the formation of a gel or viscous material, and that retains the absorbed fluid under a certain pressure or temperature. The superabsorbent polymer can have internal crosslinks, surface crosslinks, or a combination comprising at least one of the foregoing.

The SAP comprises a hydrophilic network that retains large amounts of aqueous liquid relative to the weight of the SAP (e.g., in a dry state, the SAP absorbs and retains a weight amount of water equal to or greater than its own weight). The SAPs can be a variety of synthetic organic polymers that react with or absorb water and swell when contacted with an aqueous fluid. Non-limiting examples of such SAPs are poly(hydroxy$C_{1-8}$ alkyl (meth)acrylate)s such as (2-hydroxyethyl acrylate), poly(meth)acrylamide, poly (vinyl pyrrolidine), poly(vinyl acetate), starch-acrylonitrile grafted copolymer of polyacrylonitrile, carboxymethyl cellulose, crosslinked polyacrylates, sulfonated polystyrene, hydrolyzed polyacrylamide, polyvinyl alcohol, polyethylene oxide, polyvinyl pyrrolidone, polyacrylonitrile, and the like. The foregoing are inclusive of copolymers, for example copolymers of (meth)acrylamide with maleic anhydride, vinyl acetate, ethylene oxide, ethylene glycol, or acrylonitrile, or a combination comprising at least one of the foregoing. A combination of different polymers can be used.

The SAPs are polymerized from nonionic, anionic, cationic monomers, or a combination comprising at least one of the foregoing. Polymerization can be via free-radical polymerization, solution polymerization, gel polymerization, emulsion polymerization, dispersion polymerization, or suspension polymerization. Moreover, polymerization can be performed in an aqueous phase, in inverse emulsion, or in inverse suspension.

Examples of nonionic monomers for preparing the preformed synthetic polymers include (meth)acrylamide, alkyl-substituted (meth)acrylamides, aminoalkyl-substituted (meth)acrylamides, alkyliminoalkyl-substituted (meth)acrylamides, vinyl alcohol, vinyl acetate, allyl alcohol, $C_{1-8}$ alkyl (meth)acrylates, hydroxy$C_{1-8}$ alkyl (meth)acrylates such as hydroxyethyl (meth)acrylate, N-vinylformamide, N-vinylacetamide, and (meth)acrylonitrile. As used herein, "poly ((meth)acrylamide)s" includes polymer comprising units derived from (meth)acrylamide, alkyl-substituted (meth) acrylamides such as N-$C_{1-8}$ alkyl (meth)acrylamides and N,N-di($C_{1-8}$ alkyl) (meth)acrylamides, aminoalkyl-substituted (meth)acrylamides such as N,N-di(amino($C_{1-8}$ alkyl))-substituted (meth)acrylamides, and (N,N-dialkylamino) alkyl-substituted (meth)acrylamides such as (N,N-di($C_{1-8}$ alkyl)amino)($C_{1-8}$ alkyl) (meth)acrylamides. Specific examples of the foregoing monomers include methacrylamide, N-methyl acrylamide, N-methyl methacrylamide, N,N-dimethyl acrylamide, N-ethyl acrylamide, N,N-diethyl acrylamide, N-cyclohexyl acrylamide, N-benzyl acrylamide, N,N-dimethylaminopropyl acrylamide, N,N-dimethylaminoethyl acrylamide, N-tert-butyl acrylamide, or a combination comprising at least one of the foregoing. In an embodiment, the poly((meth)acrylamide) is a copolymer of methacrylamide with maleic anhydride, vinyl acetate, ethylene oxide, ethylene glycol, or acrylonitrile, or a combination comprising at least one of the foregoing.

Examples of anionic monomers include ethylenically unsaturated anionic monomers having acidic groups or their salts, for example, a carboxylic group, a sulfonic group, a phosphonic group, a salt thereof, the corresponding anhydride or acyl halide, or a combination comprising at least one of the foregoing acidic groups. For example, the anionic monomer can be (meth)acrylic acid, ethacrylic acid, maleic acid, maleic anhydride, fumaric acid, itaconic acid, α-chloroacrylic acid, β-cyanoacrylic acid, β-methylacrylic acid, α-phenylacrylic acid, β-acryloyloxypropionic acid, sorbic acid, α-chlorosorbic acid, 2'-methylisocrotonic acid, cinnamic acid, p-chlorocinnamic acid, β-stearyl acid, citraconic acid, mesaconic acid, glutaconic acid, aconitic acid, 2-acrylamido-2-methylpropanesulfonic acid, allyl sulfonic acid, vinyl sulfonic acid, allyl phosphonic acid, vinyl phosphonic acid, a salt thereof, or a combination comprising at least one of the foregoing.

Examples of cationic monomers include (N,N-di(C1-8alkylamino)(C1-8alkyl) (meth)acrylates (e.g., N,N-dimethylaminoethyl acrylate and N,N-dimethylaminoethyl meth-acrylate), (wherein the amino group is quatemized to, e.g., a methyl chloride quaternary form), diallyldimethyl ammonium chloride, or any of the foregoing alkyl-substituted (meth)acrylamides and dialkylaminoalkyl-substituted (meth)acrylamides, such as (N,N-di($C_{1-8}$galkyl)amino)$C_{1-8}$-alkyl acrylamide, and the quaternary forms thereof such as acrylamidopropyl trimethyl ammonium chloride.

The superabsorbent polymer can contain both cationic substituents and anionic substituents. The cationic substituents and anionic substituents occur in various stoichiometric proportions, for example, a ratio of about 1:1, or one monomer can be present in a greater stoichiometric amount than the other monomer. Representative amphoteric polymers include terpolymers of nonionic monomers, anionic monomers and cationic monomers.

In an embodiment, the SAP includes a repeating unit derived from an acrylate, an acrylic acid or a salt thereof, an acrylamide, a vinylpyrrolidone, a vinyl ester (e.g., a vinyl acetate), a vinyl alcohol, a 2-acrylamide-2-methylpropanesulfonic acid, a derivative thereof, or a combination thereof The superabsorbent polymer can include a plurality of crosslinks among the polymer chains of the superabsorbent polymer. The crosslinks can be covalent and result from crosslinking the polymer chains using a crosslinker. The crosslinks are formed before the SAP is combined with the aqueous carrier. The crosslinker can be an ethylenically-unsaturated monomer that contains, for example, two sites of ethylenic unsaturation (i.e., two ethylenically unsaturated double bonds), an ethylenically unsaturated double bond and a functional group that is reactive toward a functional group (e.g., an amide group) of the polymer chains of the superabsorbent polymer, or several functional groups that are reactive toward functional groups of the polymer chains of the superabsorbent polymer. The degree of crosslinking can be selected so as to control the amount of swelling of the superabsorbent polymer. For example, the degree of crosslinking can be used to control the amount of fluid absorption or the volume expansion of the superabsorbent polymer. Accordingly, when the polymer particles comprise a superabsorbent polymer, the degree of crosslinking can be used to control the amount of fluid absorption or the volume expansion of the polymer particles.

Exemplary crosslinkers include a di(meth)acrylamide of a diamine such as a diacrylamide of piperazine, a $C_{1-8}$ alkylene bisacrylamide such as methylene bisacrylamide and ethylene bisacrylamide, an N-methylol compounds of an unsaturated amide such as N-methylol methacrylamide or N-methylol acrylamide, a (meth)acrylate esters of a di-, tri-, or tetrahydroxy compound such as ethylene glycol diacrylate, poly(ethyleneglycol) di(meth)acrylate, trimethylopropane tri(meth)acrylate, ethoxylated trimethylol tri(meth) acrylate, glycerol tri(meth)acrylate), ethoxylated glycerol tri(meth)acrylate, pentaerythritol tetra(meth)acrylate, ethoxylated pentaerythritol tetra(meth)acrylate, butanediol di(meth)acrylate), a divinyl or diallyl compound such as allyl (meth)acrylate, alkoxylated allyl(meth)acrylate, diallylamide of 2,2'-azobis(isobutyric acid), triallyl cyanurate, triallyl isocyanurate, maleic acid diallyl ester, polyallyl esters, tetraallyloxyethane, triallylamine, and tetraallylethylene diamine, a diols polyol, hydroxyallyl or acrylate compounds, and allyl esters of phosphoric acid or phosphorous acid. Specifically mentioned are water soluble diacrylates such as poly(ethylene glycol) diacrylate (e.g., PEG 200 diacrylate or PEG 400 diacrylate). A combination comprising any of the above-described crosslinkers can also be used. Additional crosslinks are described in US 2014/0332213, US 2014/0332214, and US 2015/0096751.

When the SAP is in the form of a particle, the particle can includes surface crosslink external to the interior of the particle. The surface crosslinks can result from addition of a surface crosslinker to the superabsorbent polymer particle and subsequent heat treatment. The surface crosslinks can increase the crosslink density of the particle near its surface with respect to the crosslink density of the interior of the particle. Surface crosslinkers can also provide the particle with a chemical property that the superabsorbent polymer did not have before surface crosslinking, and can control the chemical properties of the particle, for example, hydrophobicity, hydrophilicity, and adhesiveness of the superabsorbent polymer to other materials, for example, minerals (e.g., silicates) or other chemicals, for example, petroleum compounds (e.g., hydrocarbons, asphaltene, and the like).

Surface crosslinkers have at least two functional groups that are reactive with a group of the polymer chains, for example, any of the above crosslinkers, or crosslinkers having reactive functional groups such as an acid (including carboxylic, sulfonic, and phosphoric acids and the corresponding anions), an amide, an alcohol, an amine, or an aldehyde. Exemplary surface crosslinkers include polyols, polyamines, polyaminoalcohols, and alkylene carbonates, such as ethylene glycol, diethylene glycol, triethylene glycol, polyethylene glycol, glycerol, polyglycerol, propylene glycol, diethanolamine, triethanolamine, polypropylene glycol, block copolymers of ethylene oxide and propylene oxide, sorbitan fatty acid esters, ethoxylated sorbitan fatty acid esters, trimethylolpropane, ethoxylated trimethylolpropane, pentaerythritol, ethoxylated pentaerythritol, polyvinyl alcohol, sorbitol, ethylene carbonate, propylene carbonate, and combinations comprising at least one of the foregoing.

Additional surface crosslinkers include borate, titanate, zirconate, aluminate, chromate, or a combination comprising at least one of the foregoing. Boron crosslinkers include boric acid, sodium tetraborate, encapsulated borates, and the like. Borate crosslinkers can be used with buffers and pH control agents including sodium hydroxide, magnesium oxide, sodium sesquicarbonate, and sodium carbonate, amines (such as hydroxyalkyl amines, anilines, pyridines, pyrimidines, quinolines, pyrrolidines, and carboxylates such as acetates and oxalates), delay agents including sorbitol, aldehydes, sodium gluconate, and the like. Zirconium crosslinkers, e.g., zirconium lactates (e.g., sodium zirconium lactate), triethanolamines, 2,2'-iminodiethanol, or a combination comprising at least one of the foregoing can be used. Titanates crosslinkers can include, for example, lactates, triethanolamines, and the like.

Preferably the crosslinks are formed before the SAP is combined with the aqueous carrier. Accordingly the treatment fluids and/or fracturing fluids disclosed herein can be free of crosslinking agents. In an embodiment, the superabsorbent polymer does not have any surface crosslinks.

Non-limiting examples of SAPs include poly 2-hydroxyethyl acrylate, polyalkyl acrylate, polyacrylamide, poly methacrylamide, poly vinylpyrrolidone, poly vinyl acetate, polyacrylic acid, polyacrylic acid salt, or copolymers thereof As a specific example, the SAP is polyacrylamide having crosslinks that are polyethylene glycol diacrylate. As another specific example, the SAP is a copolymer of acrylamide with, for example, maleic anhydride, vinyl acetate, ethylene oxide, ethylene glycol, acrylonitrile, or a combination thereof. Another specific example of SAP is polyacrylamide having crosslinks that are polyethylene glycol diacrylate. In some embodiments, the SAP is polyacrylic acid homopolymer or copolymer, wherein the crosslinks are vinyl ester oligomer. In an embodiment, the superabsorbent polymer is a copolymer of acrylic acid and sodium acrylate having crosslinks derived from polyethylene glycol diacrylate.

The SAP can be in a number of formats, including a particle (e.g., a powder), fiber, strand, braid, and the like, or a combination thereof. The size of the SAP is from 10 µm to 200,000 µm, specifically 50 µm to 10,000 µm, and more specifically 50 µm to 1,000 µm. As used herein, "size" refers to the largest linear dimension, e.g., a diameter in a spherical particle. Particles of the SAP are any shape including spherical, angular, and polyhedral. As used herein, "size" refers to the largest linear dimension, e.g., a diameter in a spherical particle. Particles of the SAP are any shape including spherical, angular, and polyhedral.

In some embodiments, the treatment fluids and/or fracturing fluids can further comprise a polysaccharide. Exemplary polysaccharides include starch, cellulose, xanthan gum, agar, pectin, alginic acid, tragacanth gum, pluran, gellan gum, tamarind seed gum, cardlan gum, guar gum, arabic, glucomannan, chitin, chitosan, hyaluronic acid, and combinations comprising at least one of the foregoing. The amount of the polysaccharide in the fracturing fluid is between from about 1 pound of the polysaccharide per thousand gallons of the fracturing fluid (ppt) to about 30 ppt, specifically from about 2 ppt to about 25 ppt or from about 4 ppt to about 20 ppt. Without wishing to be bound by theory, it is believed that the addition of a small amount of polysaccharide can further improve the hydration of the SAP. However, it is appreciated that a polysaccharide is an optional component. In some embodiments, the treatment fluids and/or fracturing fluids are free of polysaccharides.

The aqueous carrier includes fresh water, brine (including seawater), an aqueous acid (for example a mineral acid or an organic acid), an aqueous base, or a combination comprising at least one of the foregoing. It will be appreciated that other polar liquids such as alcohols and glycols, alone or together with water, may be used in the carrier fluid.

The brine can be, for example, seawater, produced water, completion brine, or a combination comprising at least one of the foregoing. The properties of the brine can depend on the identity and components of the brine. Seawater, for example, can contain numerous constituents including sulfate, bromine, and trace metals, beyond typical halide-containing salts. Produced water can be water extracted from a production reservoir (e.g., hydrocarbon reservoir) or produced from the ground. Produced water can also be referred to as reservoir brine and contain components including barium, strontium, and heavy metals. In addition to naturally occurring brines (e.g., seawater and produced water), completion brine can be synthesized from fresh water by addition of various salts for example, KCl, NaCl, $ZnCl_2$, $MgCl_2$, or $CaCl_2$ to increase the density of the brine, such as about 1 to about 0.6 pounds per gallon of $CaCl_2$ brine. Completion brines typically provide a hydrostatic pressure optimized to counter the reservoir pressures downhole. The above brines can be modified to include one or more additional salts. The additional salts included in the brine can be NaCl, KCl, NaBr, $MgCl_2$, $CaCl_2$, $CaBr_2$, $ZnBr_2$, $NH_4Cl$, sodium formate, cesium formate, and combinations comprising at least one of the foregoing. The salt can be present in the brine in an amount of about 0.5 to about 50 weight percent (wt. %), specifically about 1 to about 40 wt. %, and more specifically about 1 to about 25 wt %, based on the weight of the fluid.

The hydraulic fracturing composition can further include a breaker in some embodiments. The breaker contacts the SAP and/or the borated galactomannan to break the SAP and/or borated galactomannan. In an embodiment, the breaker contacts the SAP and breaks a bond in the backbone of the polymer chains of the SAP, a bond in the crosslinker, a bond between the crosslinker and a polymer chain of the SAP, or a combination thereof. That is, breaking the SAP includes disintegrating, decomposing, or dissociating the SAP such as by breaking bonds in the backbone of the SAP, breaking crosslinks among chains of the SAP, changing a geometrical conformation of the superabsorbent polymer, or a combination thereof. In this way, the viscosity of the hydraulic fracturing composition decreases. In some embodiments, the breaker breaks the SAP to form a decomposed polymer such as a plurality of fragments that have a lower molecular weight than the SAP.

The breaker includes an oxidizer such as a peroxide, a persulfate, a perphosphate, a perborate, a percarbonate, a persilicate, an oxyacid of a halogen, an oxyanion of halogen, a peracid, a derivative thereof, or a combination thereof The breaker is optionally encapsulated in an encapsulating material to prevent the breaker from contacting the SAP. The encapsulating material is configured to release the breaker in response to the breaking condition. The breaker is a solid or liquid. As a solid, the breaker is, e.g., a crystalline or granular material. In an embodiment, the solid is encapsulated or provided with a coating to delay its release or contact with the SAP. Encapsulating materials are the same or different as the coating material noted above with regard to the proppant particles. Methods of disposing the encapsulating material on the breaker are the same or different as for disposing the coating on the proppant particles. In an embodiment, a liquid breaker is dissolved in an aqueous solution or another suitable solvent.

The breaker can be present in the hydraulic fracturing composition in a mass concentration from 0.1 ppt to 20 ppt, specifically 0.2 ppt to 15 ppt, and more specifically, 0.25 ppt to 10 ppt, based on the total volume of the fluid.

The hydraulic fracturing compositions can further comprise other components known for use in fracturing compositions, for example a viscosifier, a viscosifier crosslinker, a pH control agent, a surfactant, a breaker, a lubricant, a fluid loss agent, a clay stabilizer, a biocide, an acid, a corrosion inhibitor, an oxygen scavenger, or a combination comprising at least one of the foregoing. These additional components are selected so as to avoid imparting unfavorable characteristics to the hydraulic fracturing composition, to avoid damage to equipment in contact with the fracturing composition, and to avoid damaging the wellbore or subterranean formation. The additives as well as the amounts of the additives are known and have been described for example in U.S. 2014/03322123 and U.S. 2014/0332214.

Superabsorbent polymers as disclosed herein have been found to have good proppant transport characteristics at low pumping conditions such as needed for gravel pack or frac pack applications. In some embodiments, superabsorbent polymers or a composite of a superabsorbent polymer and a proppant can be used for sand control applications. In particular, the superabsorbent polymer particles can support proppant for long horizontal well gravel packs. If desired, a gravel pack screen can also be introduced downhole.

A sand control method for a wellbore penetrating a subterranean formation comprises: introducing into the wellbore a formation sand control composition comprising a superabsorbent polymer, a proppant, and a carrier fluid; and placing the proppant particles adjacent the subterranean formation to form a fluid-permeable pack capable of reducing or substantially preventing the passage of formation sand from the subterranean formation into the wellbore while allowing passage of formation fluids from the subterranean formation into the wellbore. In an embodiment, the proppant comprises lightweight proppant such as LiteProp™. The formation sand control composition can also contain a composite of the proppant and the superabsorbent polymer.

If desired, a screen assembly such as is known in the art may be placed or otherwise disposed within the wellbore so that at least a portion of the screen assembly is disposed adjacent the subterranean formation. A composition including proppant particles, SAP polymer, and a carrier fluid may then be introduced into the wellbore and placed adjacent the subterranean formation by circulation or other suitable method so as to form a fluid-permeable pack in an annular area between the exterior of the screen and the interior of the wellbore. If desired, the superabsorbent polymer can be broken after forming the fluid-permeable pack using a breaker as disclosed herein.

Set forth below are various embodiments of the disclosure.

Embodiment 1. A method of treating a subterranean formation, the method comprising: forming a storable aqueous suspension comprising a carrier fluid, a superabsorbent polymer, a proppant, the proppant being suspended in the carrier fluid as a substantially perfectly supported particulate slurry; diluting the storable aqueous suspension in-line to a desired concentration; and introducing the diluted storable aqueous suspension into the subterranean formation.

Embodiment 2. The method of Embodiment 1, wherein the storable aqueous suspension comprises about 10 to about 100 pounds of the superabsorbent polymer per one thousand gallons of the storable aqueous suspension.

Embodiment 3. The method of Embodiment 1 or Embodiment 2, wherein the diluted storable aqueous suspension comprises about 0.5 to about 35 pounds of the superabsorbent polymer and about 1 to about 12 pounds of the proppant per one thousand gallons of the diluted storable aqueous suspension.

Embodiment 4. The method of any one of Embodiments 1 to 3, wherein the superabsorbent polymer comprises a repeating unit derived from an acrylic acid or a salt thereof, an acrylate, an acrylamide, a vinylpyrrolidone, a vinyl acetate, a vinyl alcohol, a 2-acrylamide-2-methylpropanesulfonic acid, a derivative thereof, or a combination thereof, and internal crosslinks formed before the superabsorbent polymer is combined with the carrier fluid.

Embodiment 5. The method of any one of Embodiments 1 to 4, forming a storable aqueous suspension comprises combining the superabsorbent polymer, the proppant, and the carrier fluid.

Embodiment 6. The method of any one of Embodiments 1 to 5, wherein forming a storable aqueous suspension comprises combining the carrier fluid with a composite comprising the proppant and the superabsorbent polymer in an unhydrated form, the superabsorbent polymer being at least partially embedded in a void area of the proppant.

Embodiment 7. The method of any one of Embodiments 1 to 6, further comprising combining the diluted storable aqueous suspension with a gaseous fluid under pressure to form a treatment fluid; and introducing the treatment fluid into the subterranean formation.

Embodiment 8. The method of Embodiment 7, wherein the gaseous fluid constitutes less than about 50 volume percent, and a sum of the volumes of the gaseous fluid, the proppant, and the superabsorbent polymer is greater than about 50%, each based on the total volume of the treatment fluid.

Embodiment 9. A method of fracturing a subterranean formation, the method comprising: suspending a proppant in a fluid comprising an aqueous-based carrier and a superabsorbent polymer to form a proppant-containing fluid; combining the proppant-containing fluid with a gaseous fluid to form a fracturing composition, the gaseous fluid constituting less than about 50 volume percent, and the sum of the volumes of the gaseous fluid, the proppant, and the superabsorbent polymer is greater than about 50%, each based on the total volume of the fracturing composition; and introducing the fracturing composition into the subterranean formation.

Embodiment 10. The method of Embodiment 9, wherein the fracturing composition comprises about 0.5 to about 50 pounds of the superabsorbent polymer per one thousand gallons of the proppant-containing fluid.

Embodiment 11. The method of Embodiment 9 or Embodiment 10, wherein the superabsorbent polymer comprises a repeating unit derived from an acrylic acid or a salt thereof, an acrylate, an acrylamide, a vinylpyrrolidone, a vinyl acetate, a vinyl alcohol, a 2-acrylamide-2-methylpropanesulfonic acid, a derivative thereof, or a combination thereof; and internal crosslinks formed before the superabsorbent polymer is combined with the aqueous-based carrier.

Embodiment 12. The method of any one of Embodiments 9 to 11, wherein the fracturing composition further comprises a viscosity modifying agent comprising a polysaccharide, a viscoelastic surfactant gelling agent, an uncrosslinked polymer comprising repeating units derived from one or more of the following monomers: an acrylate; an acrylamide; a vinylpyrrolidone; a vinyl ester; a vinyl alcohol; or a 2-acrylamide-2-methylpropanesulfonic acid, or a combination comprising at least one of the foregoing.

Embodiment 13. The method of any one of Embodiments 9 to 12, wherein the fracturing composition is free of a viscosity modifying agent.

Embodiment 14. The method of any one of Embodiments 9 to 13, further comprising pumping a pad fluid comprising a gaseous fluid into the formation at a pressure sufficient to initiate a fracture.

Embodiment 15. The method of Embodiment 14, wherein the pad fluid comprises a gaseous fluid and an aqueous fluid.

Embodiment 16. A sand control method for a wellbore penetrating a subterranean formation, the method comprising: introducing into the wellbore a formation sand control composition comprising a superabsorbent polymer, a proppant, and a carrier fluid; and placing the superabsorbent polymer and the proppant particles adjacent the subterranean formation to form a fluid-permeable pack capable of reducing or substantially preventing the passage of formation sand from the subterranean formation into the wellbore while allowing passage of formation fluids from the subterranean formation into the wellbore.

Embodiment 17. The method of Embodiment 16, wherein the proppant has a specific gravity of less than about 2.4.

Embodiment 18. The method of Embodiment 16 or Embodiment 17, wherein the superabsorbent polymer comprises a repeating unit derived from an acrylic acid or a salt thereof, an acrylate, an acrylamide, a vinylpyrrolidone, a vinyl acetate, a vinyl alcohol, a 2-acrylamide-2-methylpropanesulfonic acid, a derivative thereof, or a combination thereof; and internal crosslinks formed before the superabsorbent polymer is combined with the aqueous-based carrier.

Embodiment 19. The method of any one of Embodiments 16 to 18, wherein the formation sand control composition comprises about 10 to about 100 pounds of the superabsorbent polymer per one thousand gallons of the formation sand control composition.

Embodiment 20. The method of any one of Embodiments 16 to 20, further comprising forming a composite of the superabsorbent polymer and the proppant particles; and combining the composite with the carrier fluid to form the formation sand control composition.

Embodiment 21. The method of Embodiment 20, wherein the composite comprises proppant particles having void areas and the superabsorbent polymer in an unhydrated form at least partially embedded in the void areas of the proppant particles.

Embodiment 22. The method of any one of Embodiments 16 to 21, further comprising installing a screen device in the wellbore.

Embodiment 23. The method of any one of Embodiments 16 to 22, further comprising breaking the superabsorbent polymer after forming the fluid-permeable pack.

All ranges disclosed herein are inclusive of the endpoints, and the endpoints are independently combinable with each other. "Or" means "and/or." As used herein, "combination" is inclusive of blends, mixtures, alloys, reaction products, and the like. All references are incorporated herein by reference.

The use of the terms "a" and "an" and "the" and similar referents in the context of describing the invention (especially in the context of the following claims) are to be construed to cover both the singular and the plural, unless otherwise indicated herein or clearly contradicted by context. The modifier "about" used in connection with a quantity is inclusive of the stated value and has the meaning dictated by the context (e.g., it includes the degree of error associated with measurement of the particular quantity).

While typical embodiments have been set forth for the purpose of illustration, the foregoing descriptions should not be deemed to be a limitation on the scope herein. Accordingly, various modifications, adaptations, and alternatives can occur to one skilled in the art without departing from the spirit and scope herein.

What is claimed is:

1. A method of treating a subterranean formation, the method comprising:
   forming a storable aqueous suspension comprising
      a carrier fluid,
      a superabsorbent polymer, and
      a proppant, the proppant being suspended in the carrier fluid as a substantially perfectly supported particulate slurry;
   diluting the storable aqueous suspension in-line to a desired concentration; and
   introducing the diluted storable aqueous suspension into the subterranean formation;
   wherein forming a storable aqueous suspension comprises combining
      the carrier fluid with
      a composite comprising the proppant and the superabsorbent polymer in an unhydrated form, the superabsorbent polymer being at least partially embedded in a void area of the proppant and mechanically locked with the proppant in the composite.

2. The method of claim 1, wherein the proppant used to make the composite has an internal porosity of about 4 to about 40 volume percent.

3. A method of fracturing a subterranean formation, the method comprising:
   suspending a proppant in a fluid comprising an aqueous-based carrier and a superabsorbent polymer to form a proppant-containing fluid;
   combining the proppant-containing fluid with a gaseous fluid to form a fracturing composition, the gaseous fluid constituting less than about 50 volume percent, and a sum of the volumes of the gaseous fluid, the proppant, and the superabsorbent polymer is greater than about 50%, each based on the total volume of the fracturing composition; and
   introducing the fracturing composition into the subterranean formation,
   wherein the superabsorbent polymer comprises a repeating unit derived from an acrylic acid or a salt thereof, an acrylate, an acrylamide, a vinylpyrrolidone, a vinyl acetate, a vinyl alcohol, a 2-acrylamide-2-methylpropanesulfonic acid, a derivative thereof, or a combination thereof; and
   internal crosslinks formed before the superabsorbent polymer is combined with the aqueous-based carrier.

4. The method of claim 3, wherein the fracturing composition comprises about 0.5 to about 50 pounds of the superabsorbent polymer per one thousand gallons of the proppant-containing fluid.

5. The method of claim 3, wherein the fracturing composition further comprises a viscosity modifying agent comprising a polysaccharide, a viscoelastic surfactant gelling agent, an uncrosslinked polymer comprising repeating units derived from one or more of the following monomers: an acrylate; an acrylamide; a vinylpyrrolidone; a vinyl ester; a vinyl alcohol; or a 2-acrylamide-2-methylpropanesulfonic acid, or a combination comprising at least one of the foregoing.

6. The method of claim 3, wherein the fracturing composition is free of a viscosity modifying agent.

7. The method of claim 3, further comprising pumping a pad fluid comprising a second gaseous fluid into the formation at a pressure sufficient to initiate a fracture.

8. The method of claim 7, wherein the pad fluid comprises the second gaseous fluid and an aqueous fluid.

* * * * *